United States Patent
Aquino et al.

(10) Patent No.: US 6,389,131 B1
(45) Date of Patent: May 14, 2002

(54) ENHANCED INITIATE CALL ATTEMPT

(75) Inventors: Marino K. Aquino, Aurora; Barry W. Briggs; Ning-Yin Chou, both of Naperville; Kathleen Dalbey, Plainfield, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/161,966

(22) Filed: Sep. 28, 1998

(51) Int. Cl.[7] .................. H04M 7/00; H04M 3/00; G06F 11/00
(52) U.S. Cl. ............... 379/230; 379/255; 370/229
(58) Field of Search .................... 379/207, 229, 379/230

(56) References Cited

U.S. PATENT DOCUMENTS

| | | | |
|---|---|---|---|
| 4,479,034 A | * 10/1984 | Brightman et al. | 379/255 |
| 5,479,495 A | * 12/1995 | Blumhardt | 379/207 |
| 5,680,390 A | * 10/1997 | Robrock, II | 370/229 |
| 5,732,130 A | * 3/1998 | Iapalucci et al. | 379/207 |
| 5,805,636 A | * 9/1998 | Rao et al. | 375/222 |
| 6,097,804 A | * 8/2000 | Gilbert et al. | 379/230 |
| 6,104,803 A | * 8/2000 | Weser et al. | 379/230 |
| 6,128,378 A | * 10/2000 | Diener et al. | 379/221 |

* cited by examiner

Primary Examiner—Ahmad F. Matar
Assistant Examiner—Hector A. Agdeppa
(74) Attorney, Agent, or Firm—Werner Ulrich

(57) ABSTRACT

A method and apparatus for establishing calls initiated by an initial call attempt request to permit the characteristics of call connections established in response to the ICA request to be controlled by translation information of a defining port. The defining port can be a real port of a switch, or a pseudo port having associated therewith a block of translation information, but no physical network equipment. Among the characteristics that can be controlled are a billing number of the call, and a routing plan for determining a route based on destination information specified in the ICA request, and the line or trunk features offered in the switch. Advantageously, the characteristics of the ICA request connection can be specified by translation information instead of being inflexibly tied to the pre-defined standard characteristics. Advantageously, this arrangement allows the full flexibility of port translations to be applied to ICA requests without requiring that a physical port be assigned to correspond to the translations required for determining where and how a call is to be routed to the target port. Advantageously, the existing call control structures (terminal processes, interfaces with the SCP) can be used without major modification.

34 Claims, 3 Drawing Sheets

Figure 1:
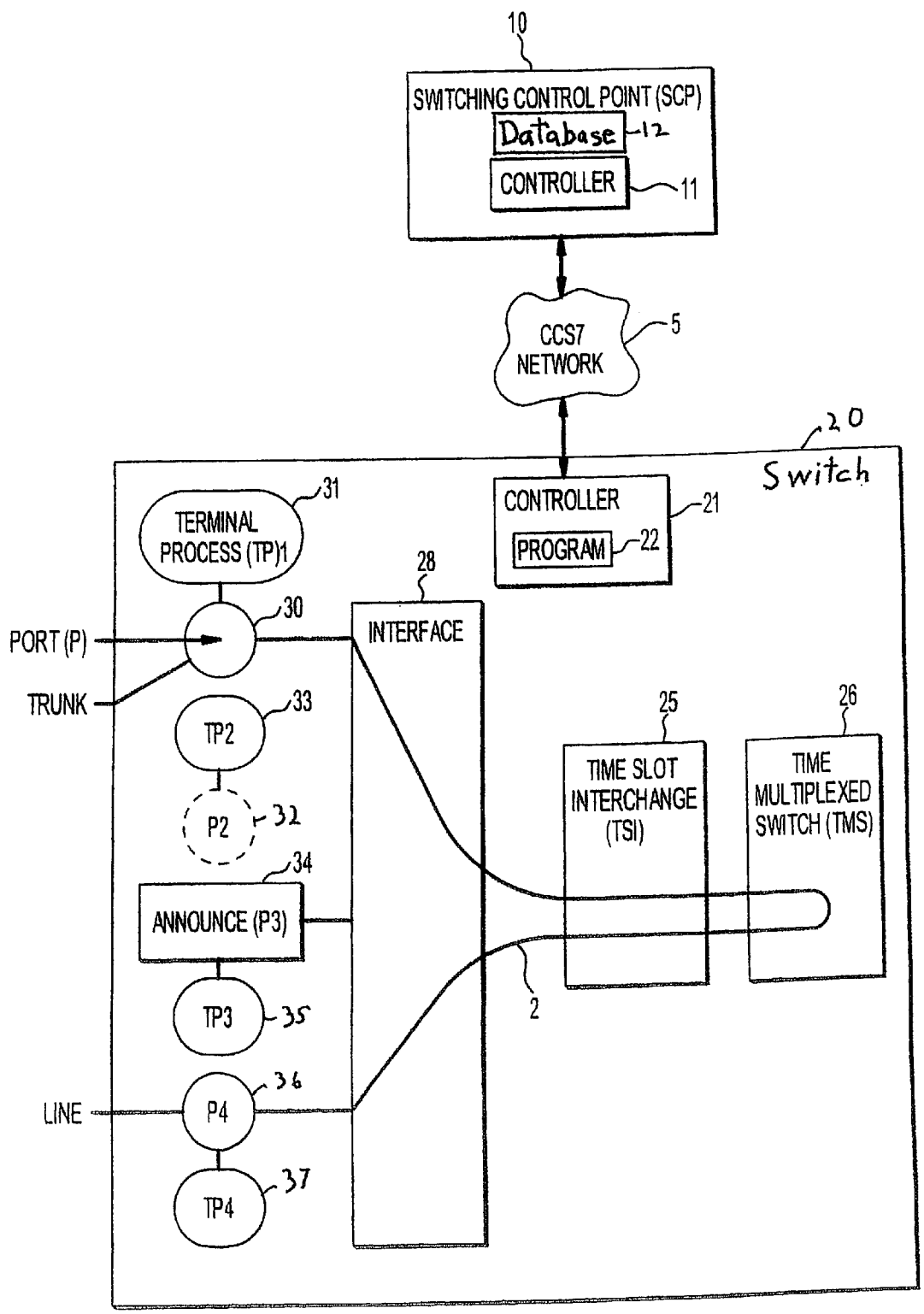

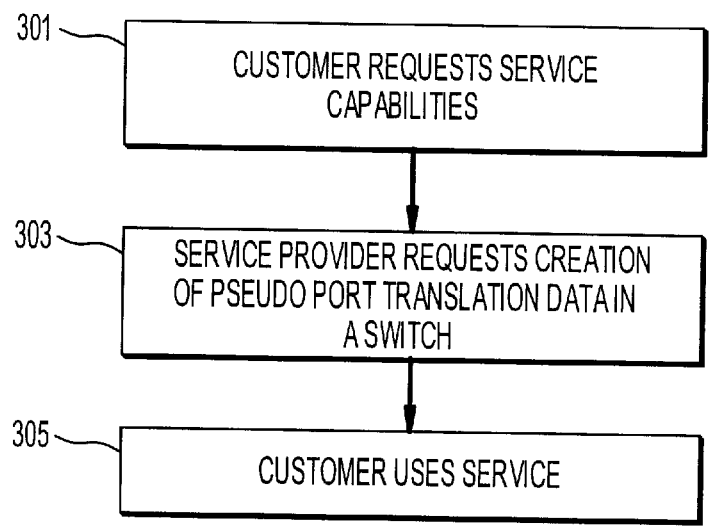
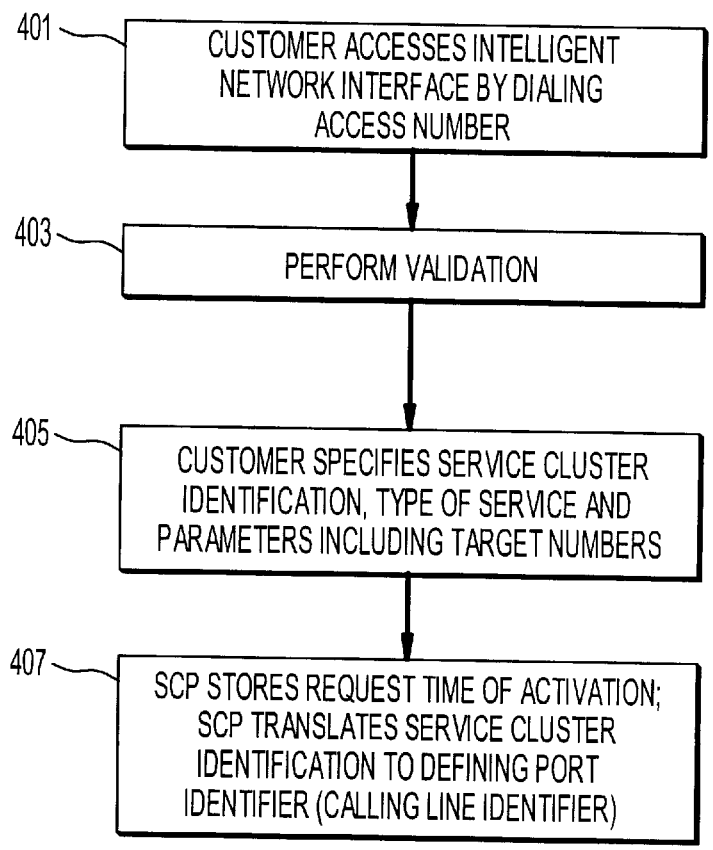

ENHANCED INITIATE CALL ATTEMPT

TECHNICAL FIELD

This invention relates to a method and apparatus for providing enhanced intelligent network capabilities.

Problem:

One of the capabilities of the advanced intelligent network is the capability for initiating telecommunications connections. A service control point sends commands to one or more connected switching systems to establish connections in accordance with commands. The switching systems respond whenever the process of establishing a connection encounters a trigger detection point such as the encountering of a busy signal or an answer signal. In response to receiving a report, the SCP issues new commands to the switches. This arrangement can be used effectively, for example, to automatically establish a multi-party conference call one leg at a time, including capabilities for connecting an alternate leg if one of the specified legs is either busy or does not answer.

Solution:

Applicant has recognized that a problem of the prior art is that the Initiate Call Attempt, (ICA), process is inflexible in that the characteristics of a connection are predefined by standards, and hard coded in a switch, (switching system). This problem is solved, and an advance is made over the prior art in accordance with Applicants' invention wherein an ICA request from a service control point (SCP) is directed to a switch and specifies. the identity of a real or a pseudo calling port for providing translation data to specify the characteristics of a desired connection. The translations associated with a pseudo calling port are the same as translations which would be associated with a real port thereby providing the full range of capabilities of a switching system to either a real or a pseudo port. In response to a request to connect to some other port, the target port, a time slot is assigned for such a connection to the target port. The connection from the target port to a customer station or to another switch is established in the usual way. In response to events that are to be reported to the SCP, events such as "busy", "answer", "failure to answer" after a certain time-out interval, the SCP sends another message requesting that a connection be established between the target port, and an announcement generator or another port of the originating switch.

In the prior art, the ICA request can specify a connection to a previously specified target port. In accordance with this invention, a pseudo port, or real port, is used to specify the characteristics of the connection, even though no connection is made to the pseudo, or real port, using the translations of the pseudo, or real port. The characteristics (billing plan, dialing plan, bandwidth, length of call, etc.), of a connection to the target port can be specified by the translations associated with the pseudo or real port (defining port). These characteristics include the line and trunk features available in the switching system. Advantageously, the characteristics of a connection can be specified by translation information instead of being inflexibly tied to the pre-defined standard characteristics. Advantageously, this arrangement allows the full flexibility of port- translations to be applied to ICA requests without requiring that a physical port be assigned to correspond to the translations required for determining where, and how a call is to be routed to the target port. Advantageously, the existing call control structures, (terminal processes, signaling interfaces, and interface with the SCP), can be used without major modification.

In response to an ICA request, an ICA terminal process is created in the switch. In accordance with the principles of Applicant's invention, the ICA terminal process instead of being associated with the target port, or other port of the connection, is associated with a real, or pseudo, i.e., defining port, providing the translation data for determining the characteristics of the connection. The association with the defining port allows the terminal process to access translation information required to identify the dialing plans and billing information for the defining port. The ICA terminal process for the defining port must be able to process and connect multiple call appearances in order to provide the facilities for letting that terminal process control a conference call, or to control any other call between two physical ports. The ICA terminal process for the defining port must also interface with terminal processes for physical terminals.

In accordance with one feature of this invention, an ICA request can be used to establish a connection to a line served by this or another switch. That line can then use the characteristics of a port or pseudo port of the switch connected to the SCP for the duration of the connection.

In accordance with Applicant's invention, a new recent change facility is required to provide the definitions of service characteristics needed to populate the data base for a pseudo port. This is accomplished by providing facilities to specify a pseudo calling line identification for creating translations for a pseudo port. A relation is then used, accessed by the pseudo calling line identification, to point to the tuple which contains the translation information associated with the pseudo port.

In one preferred embodiment of Applicant's invention, the ICA for the defining port terminal process is a conventional originating terminal process in a switching system of an intelligent network. The ICA for the defining port terminal process is responsive to commands from the SCP as in the prior art. The call processing transactions are initiated by a command message from the SCP. The ICA terminal process for the defining port then establishes connections in accordance with the principles and protocols of the prior art, but importantly, uses the translation of the defining port, not the user port, to specify the characteristics of a connection. The defining port translation data need not be tied to the data of any existing user.

In accordance with one aspect of the invention, a connection is established from a port for accessing a destination. This port can also be connected to other ports of the switching system. Such ports include announcement systems, recording systems, speech recognition systems, conference bridges, and ports to the SCP. The latter can be used to establish an SCP to SCP connection for exchanging data between two SCPs.

A service provider establishes a translation database for a pseudo port for use by an enhanced ICA by transmitting commands to a switch using the recent change facility. A customer can then request the SCP to send an immediate, or delayed ICA request, which will use the translations of the pseudo port.

DETAILED DESCRIPTION

FIG. 1 is a block diagram illustrating the operation of Applicants' invention for a switching control point (10) that communicates with a switch 20, such as the 5ESS® switch manufactured by Lucent Technologies, Inc., which sets up connections. The communications between the switch and the SCP are carried over a signaling network which in Applicants' preferred embodiment is a CCS 7 network 5. The switch is controlled by a controller complex 21 which in Applicants' preferred embodiment is a switching module processor (SMP). The switching network comprises one or more time slot interchange (TSI) units 25 and in some cases, a time multiplexed switch (TMS) unit 26. Connected to the TSI is an interface 28 which is connected to a group of ports. Port 30 controlled by terminal process 31 is connected to a trunk and port 36, controlled by terminal process 37, is connected to a line. An announcement unit port 34 is controlled by terminal process 35. Finally, and importantly, a pseudo port 32 which has no physical existence, is controlled by terminal process 33. For other applications, such as voice messaging, a recording port, announcing/recording port, or speech recognition port can be substituted for the announcement unit port. Further, trunk port 30 can be connected to another trunk port, (not shown), for accessing another switch. The SCP 10 can also be connected to a port, (not shown), of switch 20; this port can then be connected to port 30 for accessing another switch which, in turn, can be used for accessing a second SCP.

As an example of a service that can be provided in using this arrangement, consider wake-up service. SCP 10 has in its data base 12, information indicating that a particular customer is to be awakened at a certain time. When that time comes, SCP 10 via its controller 11, sends an ICA request message to switch 20, via its controller 21. The controller operates under the control of a program 22. The message requests that a, connection be established under the initial control of terminal process 33 between pseudo port 32 and a trunk port to be selected by translating the identity of the target port, in this case, port 30. In order to use the existing software of the switch, and therefore, be able to handle all features implemented by that software, the logical connection from the trunk port 30 is treated in the switch as if a connection had been established to a real port of the switch. Terminal process 33 handles billing for the call, which in this case will be billed to the called party being awakened. When terminal process 31 receives a message indicating that the called party has answered, it communicates the answer to the connected terminal process 33. Terminal process 33 then requests additional call directing information from the SCP 10 The SCP 10 responds with a request to connect to a wake-up announcement, or tone facility. In response to this request, terminal process 33 requests the controller 21 to set up connection 2 between a wake-up announcement, or other tone, 34, controlled by terminal process 35, and trunk port 30. The wake-up announcement 34 has an associated terminal process 35 which serves to control the announcement end of the connection. Terminal process 33 continues to be active in the call, essentially as if it were on a held leg of the call; therefore, when a disconnect signal message is returned, it is routed to terminal process 31 which passes the disconnect message on to terminal process 33. Terminal process 33 requests further call directing information from SCP 10. In response to the receipt of this further information, terminal process 33 records billing information for the call, and requests the release of the connection between the announcement port 34 and the trunk port 30, and the restoration of these ports to the idle status. The release and restoration is under the control of the terminal process 35 for the announcement port, and terminal process 31 for the trunk port, both of which terminal processes are then released.

It is apparent from this description, that the pseudo port acts from the point of view of the software very much as if it were a real port, having an associated terminal process for controlling all those actions which are normally under the control of a real port. However, for the services controlled by the pseudo port, no real port is required since no party is connected physically to the pseudo port, and no announcement or tone source is connected to that pseudo port. The pseudo port can be used for initiating conference call connections acting essentially as if it were a controlling, but unconnected port. The pseudo port receives all requests for action from the SCP, and is connected via the software structure to receive all signals pertaining to the calls that it controls. In response to receipt of these signals, the pseudo port sends a request to the SCP to out what the action should be. For example, in response to the answer detected at trunk port 30, terminal process 33 requests information as to the next action from SCP 10.

The pseudo port needs translation information in order to define the characteristics of the connections which are set up under the control of the pseudo port. The key used for accessing these translations is a calling line identifier which is supplied in the ICA request message from the SCP. This identification is the equivalent of a directory number and is used in the switch to identify the module, circuit location, and equivalent of a party number for the pseudo port. It is also used as a key to access the block of translation information which provides billing data (e.g., the identification of the telephone number which is to be billed for the calls), dialing plan (e.g., indications as to which telephone numbers may be accessed for calls controlled by the pseudo port), the bandwidth of the call, (which indicates whether the call is to be a high speed data call, or a voice call), limitations on the length of the call, and other line or trunk features available in the switching system. All of these items (if information are the same types of items that are provided for real ports, and supported by using existing software, and software as it is enhanced in the future.

Note that the tuple which provides the information necessary to characterize connections set up under the control of the pseudo port can also be a tuple associated with a real port. Since the tuple is accessed without checking on the busy-idle state of the associated pseudo or real port, existing calls on a real port can continue, or can be originated or terminated, without interfering with the capabilities of the port as a defining port.

The ICA request can be used to establish a connection to a line served by this or another switch. That line can then make calls whose connections use the characteristics of the defining port of the switch connected to the SCP for the duration of the connection to the line served by the other switch. Effectively, this arrangement can be used to provide, for example, a form of foreign exchange service.

In some cases, for example, for a CENTREX type of application, many or all of the lines have access to the services of a common pseudo port. In these cases, if the SCP fails to identify a real, or pseudo port in its ICA request message, a default pseudo port defined for the switch is used instead of a pseudo port directly specified in the ICA request message. A common pseudo port or a default pseudo port is not limited to the most basic features, but can have any collection of features available to any other pseudo port.

If there are multiple simultaneous uses of the same pseudo port, there is no interference between the incomplete paths established in the telephone TSI to the common pseudo port. Multiple simultaneous uses of the pseudo port are possible since the pseudo port is not involved in a connection, and is used only to provide translation information for the call.

Advantageously, this arrangement allows the capabilities of an arbitrary number of different pseudo ports to be provided without requiring the dedication of real ports to the function of these different pseudo ports. Thus, a particular set of tailored services can be implemented through the use of multiple pseudo ports without the addition of equipment.

While the above example has been in terms of a pseudo port, the translation data of a real port can also be used to specify the characteristics of a connection. Further, since the pseudo port is never a part of an ICA request connection, and a real port is not a part of many types of ICA request connections, several users can use a pseudo port simultaneously, or, for connections not involving the real port, several users can use the real port simultaneously. For the purposes of this description and the Claims, the real, or pseudo port, is referred to as a defining port.

The SCP will never request a connection to a pseudo port because it knows that the pseudo port cannot be reached. If a real port is used as a defining port, the SCP may, but need not, request a connection to that port.

Figure 2:
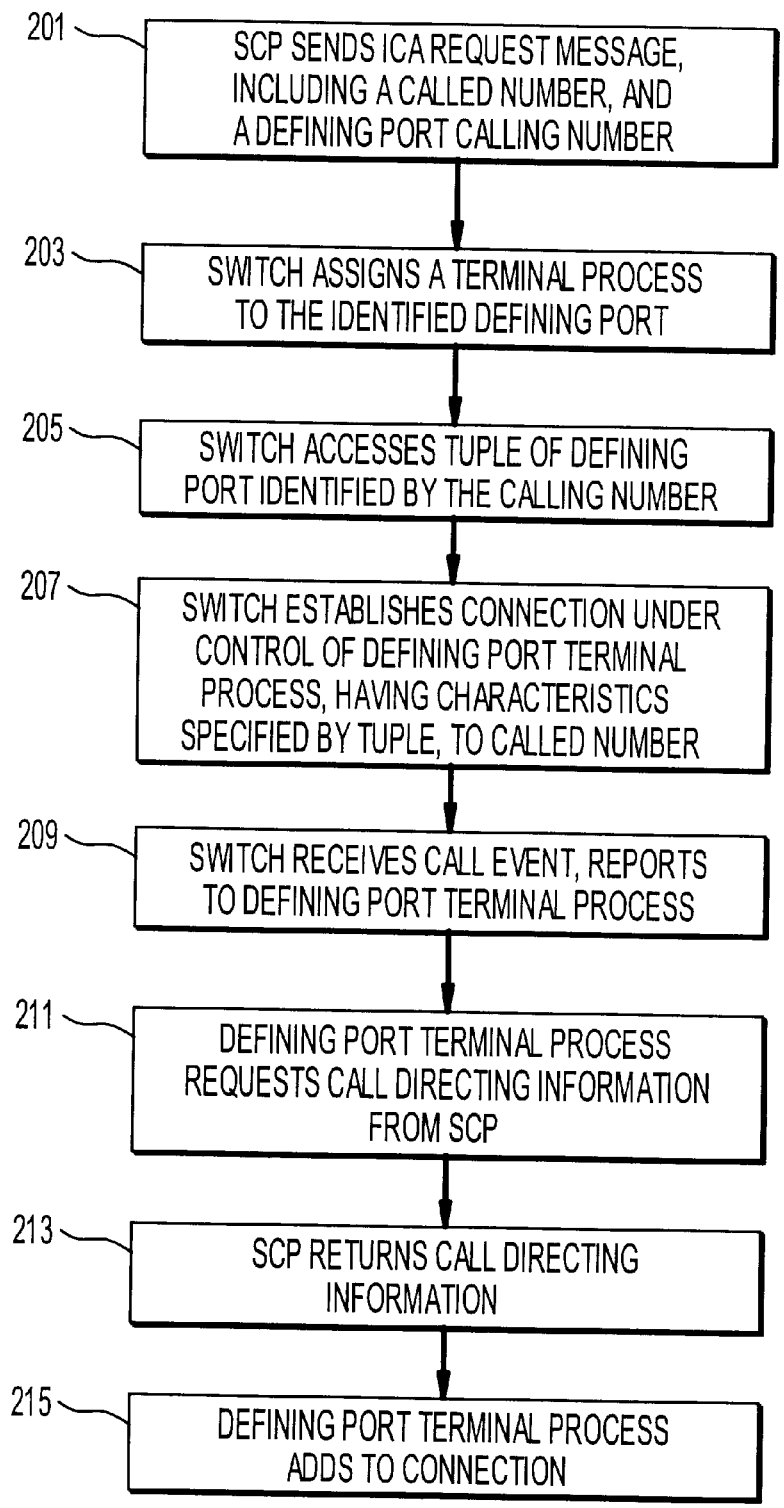

FIG. 2 is a flow diagram illustrating the operation of Applicant' invention. The SCP sends an ICA request message, including a called number and a defining port calling number to the switch (Action Block 201). The switch assigns a terminal process to the identified defining port (Action Block 203). If the ICA request message does not include a defining port calling line identifier, then a default pseudo port is assigned to the call, and the terminal process is assigned to the default pseudo port. The switch then accesses the tuple of the defining port identified by the calling line identifier, or accesses the tuple of the default defining port. The switch then establishes a connection to the called number of the type specified by the tuple, under the control of the defining port terminal process, (Action Block 207). The actions performed in Action Block 207 are those directed by existing software of the switch, and encompass the full range of call connection options available under the control of any port not directly involved in the connection.

When the switch receives a call event such as an answer, the call event which is detected in one of the other processes of the connection, this call event is reported to the defining port terminal process (Action Block 209). The defining port terminal process then requests call directing information from the SCP (Action Block 211), in conformance with standard intelligent network operations. The SCP returns call directing information to the switch (Action Block 213), and the defining port terminal process then adds to the connection in conformance with the newly received call directing information (Action Block 215). The actions of Blocks 209–215, are repeated for each new call event. Specifically, in response to a disconnect signal, a billing entry is prepared by the defining port terminal process.

FIG. 3 shows the actions for creating translations for a pseudo port. The customer requests service capabilities (Action Block 301). Such a request is made to a service provider, since customers do not normally have direct control of their own translation information. The service provider then requests the system to create a pseudo port translation block in the switch of the pseudo port (Action Block 303). At some later time then, the customer can use the service defined by this translation data (Action Block 305). Note that for the case in which an ICA request uses the translation data of a real port, nothing new is required since facilities are already available for defining the translation data of a real port. However, to define the translation data of a pseudo port, an appropriate identification must be provided, and an indication that for this translation block know real port corresponds to the translation block.

FIG. 4 illustrates the process whereby a customer requests a switching control point (SCP) to generate an ICA request immediately, or at some specified later time. The user accesses an intelligent network interface by dialing an access number (Action Block 401). The identity of the user is validated (Action Block 403) through some form of dialogue with the intelligent network, usually involving the supplying of a personal identification number (PIN) by the user. The customer then specifies some form of service cluster identification, a type of service and parameters for the service, including the directory number, or other identification of the target port (Action Block 405). The service control point then stores the request, including a time of activation; service control point translates the service cluster identification to a calling line identifier which will be provided with the ICA request to identify the service defining port.

It is to be understood that many variations on the principles of this invention can be derived by those of ordinary skill in the art. The invention is thus limited only by the attached Claims.

What is claimed is:

1. A method of controlling the establishment of a connection comprising the steps of:

receiving an ICA (Initiate Call Attempt) request message from an SCP (Switching Control Point) to a switch, the ICA request message including an identification of a destination port; and of a defining port for controlling characteristics of a connection to be established;

responsive to receipt of the ICA request message in said switch accessing a data block (tuple) defining characteristics of connections to be established under the control of said defining port;

establishing a connection from said switch to said destination port, said connection controlled by a terminal process for said defining port;

responsive to a call event signal from said connection, under the control of said defining port terminal process, requesting additional call directing information from said SCP;

responsive to an additional request message from said SCP, controlling changes in said connection under the control of said defining port terminal process;

wherein characteristics of call connections for said call are controlled by translation data of said defining port;

wherein said defining port is a pseudo port having associated therewith a block of translation information, but no physical port, and which transmits and receives no signals;

wherein the step of establishing a connection comprises establishing a connection from a port of said switch for accessing said destination port without providing a physical connection between said defining port and said port for accessing said destination port.

2. The method of claim 1, further comprising the steps of:

responsive to receipt of an answer signal from said port for accessing said destination port, informing said defining port terminal process;

said defining port terminal process requesting additional call directing data from said SCP; and responsive to receipt of further call directing information connecting said port for accessing said destination port to another real port of said switch.

3. The method of claim 2, wherein said another real port is a port of an announcement or recording system.

4. The method of claim 2, wherein said another real port is a port of a conference bridge.

5. The method of claim 2, wherein said another real port is another port for accessing another destination port.

6. The method of claim 2, wherein said another real port is a port of a speech recognition system.

7. The method of claim 2, wherein said another real port is a port connected to said SCP.

8. The method of claim 7, wherein said port connected to said SCP is connected via a trunk port of said switching system to another switching system.

9. The method of claim 8, wherein said port connected to said SCP is further connected in said another switching system to another SCP.

10. The method of claim 1, wherein said characteristics comprise a billing number for said call.

11. The method of claim 1, wherein said characteristics comprise a routing plan for interpreting a routing number of said call.

12. The method of claim 1, wherein said characteristics comprise a bandwidth requirement.

13. The method of claim 1, wherein said characteristics comprise a requirement for an ISDN (Integrated Services Digital Network) connection.

14. The method of claim 1, wherein said characteristics include line features available to a line of said switching system.

15. The method of claim 1, wherein said characteristics include trunk features available to a trunk of said switching system.

16. The method of claim 1, wherein the destination port is a line port of another switching system, further comprising the steps of:

establishing a connection to said destination port; and using the data block of said defining port to define characteristics of connections to said destination port.

17. The method of claim 1, wherein said destination port is a line port of said switching system, further comprising the step of:

using the data block of said defining port to define characteristics of connections to said destination port.

18. In a telecommunications switching system, apparatus for controlling the establishment of a telecommunications connection comprising:

means for receiving an ICA (Initiate Call Attempt) message from an SCP (Switching Control Point);

wherein the ICA request messages comprises an identification of a destination port, and of a defining port for controlling characteristics of a connection to be established in response to receiving said ICA request message;

processor means for controlling establishment of connections in said telecommunication switching system;

said processor means operative under the control of a program for accessing a data block, (tuple), defining characteristics of connections to be established under the control of said defining port for controlling subsequent operations for establishing said call in response to receipt of said ICA request message;

wherein said processor means is further operative under the control of said program:

for controlling establishment of a connection from said telecommunications switching system to a destination port specified in said ICA request message;

for creating a terminal process for said defining port;

said connection established under the control of a terminal process for said defining port;

responsive to a call event signal received from said connection, controlling transmission of a message to said SCP requesting additional call directing information, said message generated under the control of said defining port terminal process;

responsive to receipt of an additional request message from said SCP controlling changes in said connection under the control of said defining port terminal process;

wherein characteristics of call connections for said call are controlled by translation data of said defining port;

wherein said defining port is a pseudo port, having associated therewith a block of translation information, but no physical port, and which transmits and receives no signals;

wherein controlling the establishment of connections comprises controlling establishment of a connection from a port of said switch for accessing said destination port without providing a physical connection between said defining port, and said port for accessing said destination port.

19. The apparatus of claim 18, wherein said processor means are further operative under the control of said program for:

responsive to a receipt of an answer signal from said port for accessing said destination port, informing said defining port terminal process;

said defining port terminal process requesting additional call directing data from said SCP; and responsive to receipt of further call directing information, connecting said port for accessing said destination port to another real port of said switch.

20. The apparatus of claim 19, wherein said another real port is a port of an announcement or recording system.

21. The apparatus of claim 19, wherein said another real port is a port of a conference bridge.

22. The apparatus of claim 19, wherein said another real port is another port for accessing another destination port.

23. The apparatus of claim 19, wherein said another real port is a port of a speech recognition system.

24. The apparatus of claim 19, wherein said another real port is a port connected to said SCP.

25. The apparatus of claim 24, wherein said port connected to said SCP is connected via a trunk port of said switching system to another switching system.

26. The apparatus of claim 25, wherein said port connected to said SCP is further connected in said another switching system to another SCP.

27. The apparatus of claim 18, wherein said characteristics comprise a billing number for said call.

28. The apparatus of claim 18, wherein said characteristics comprise a routing plan for interpreting a routing number of said call.

29. The apparatus of claim 18, wherein said characteristics comprise a bandwidth requirement.

30. The apparatus of claim 18, wherein said characteristics comprise a requirement for an ISDN, (Integrated Services Digital Network), connection.

31. The apparatus of claim 18, wherein said characteristics include line features available to a line of said switching system.

32. The apparatus of claim 18, wherein said characteristics include trunk features available to a trunk of said switching system.

33. The apparatus of claim 18, wherein the destination port is a line port of another switching system, and wherein said processor means are further operative under the control of said program for:

establishing a connection to said destination port; and using the data block of said defining port to define characteristics of connections to said destination port.

34. The apparatus of claim 18, wherein the destination port is a line port of said switching system, and wherein said processor means are further operative under the control of said program for:

using the data block of said defining port to define characteristics of connections to said destination port.

* * * * *